June 14, 1932.     B. D. KUNKLE ET AL     1,863,343

LINK FOR SHOCK ABSORBERS

Filed July 8, 1931

Inventors
Bayard D. Kunkle
and Edwin F. Rossman
By Spencer, Hardman and Fehr
Attorneys Patented June 14, 1932

1,863,343

UNITED STATES PATENT OFFICE

BAYARD D. KUNKLE AND EDWIN F. ROSSMAN, OF DAYTON, OHIO, ASSIGNORS TO DELCO PRODUCTS CORPORATION, OF DAYTON, OHIO, A CORPORATION OF DELAWARE

LINK FOR SHOCK ABSORBERS

Application filed July 8, 1931. Serial No. 549,422.

This invention relates to an improved ball and socket joint particularly adapted for use on connecting links for shock absorbers of motor vehicles.

It is among the objects of the present invention to provide a simple and sturdy ball and socket joint which is self-lubricating and will automatically compensate for wear.

Further objects and advantages of the present invention will be apparent from the following description, reference being had to the accompanying drawing wherein a preferred embodiment of one form of the present invention is clearly shown.

Figure 1:
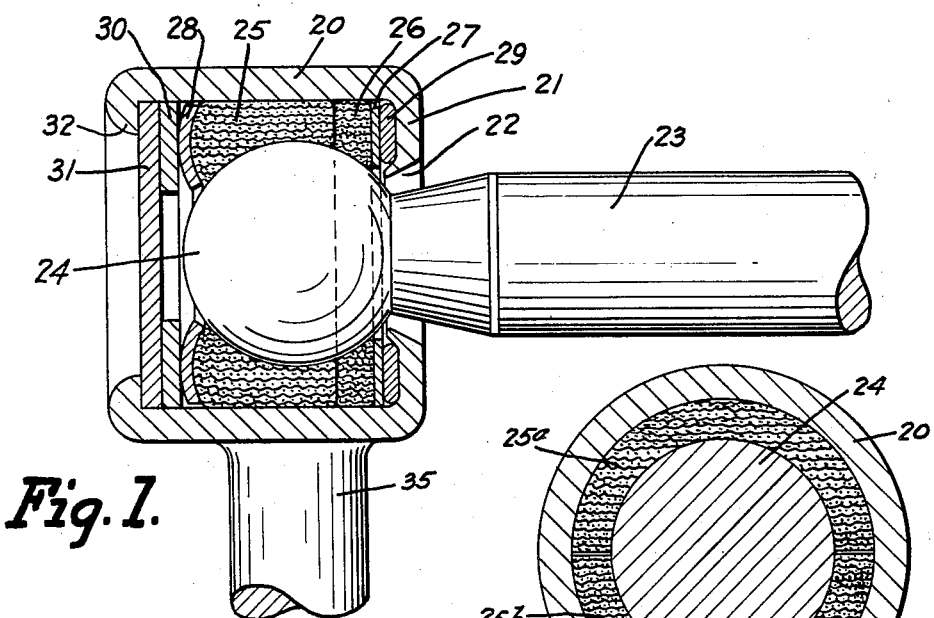
Fig. 1 is a sectional view of the ball and socket joint for a shock absorber link, the ball portion of the joint being shown in elevation.

Referring to the drawing, the numeral 20 designates the socket member, which is of cylindrical shape and has an inwardly extending annular flange 21 at its one end defining an opening 22. The other opposite end of the link is wide open before assembly. A shaft 23 is provided, having a ball end 24, said shaft extending through the opening 22 defined by the flange 21, the ball end 24 of the shaft being within the socket 20 and being of greater transverse dimensions than the opening 22, as shown in Fig. 1.

Figures 2, 4:
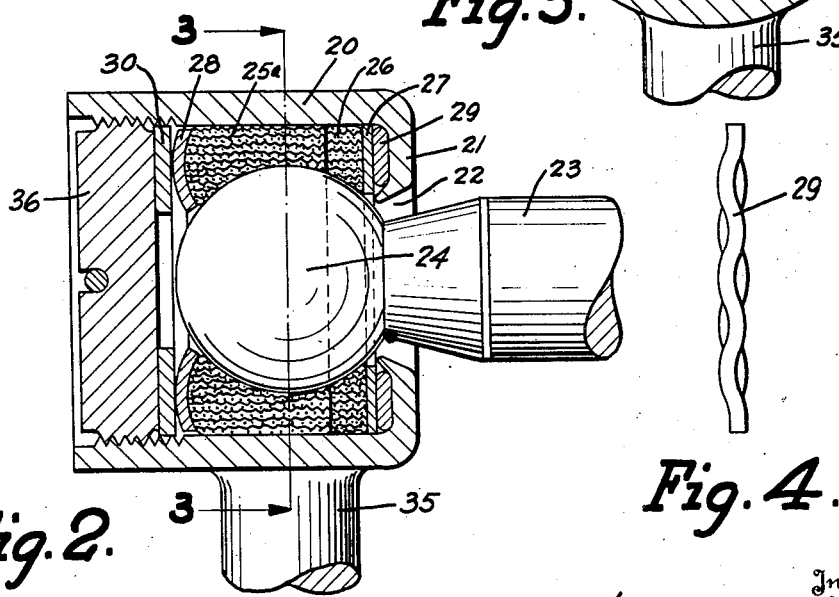
Fig. 2 is a modified form of the link shown in Fig. 1.
Fig. 4 is a side view of one of the spring washers of the joint.

The ball 24 of shaft 23 is supported within the socket 20 by lubricant containing bearing members 25 and 26, the former being substantially wider than the latter and being of a stiffer, more compressed material or fabric. As shown in Fig. 1, these bearing members 25 and 26 fit within the cylindrical socket member 20 and also about the ball end 24 of the socket 23 to maintain the ball end of said shaft substantially centrally of the socket. A ring 27, of any suitable stiff material, is provided within the socket 20 and engages the outer edge of the softer bearing member 26. A similar ring 28 engages the outer edge of the other bearing member 25. Between the flange 21 of the socket 20 and the ring 27 there is interposed a spring washer 29, shown in side elevation and uncompressed in the Fig. 4. In its uncompressed state the spring washer is undulated as shown in this figure. A similar washer 30 is interposed between the ring or pressure element 28 and a cover disc 31, which is secured within the end of the socket 20, opposite the flanged end 21, by the spun-over edge 32 of said cylindrical socket.

Before spinning the peripheral edge 32 of the socket over the disc 31, said disc is pressed into the socket so as to cause spring 30 to be compressed and flattened between said disc and the pressure element or ring 28. This pressure of the ring 28 on the bearing member 25 will also exert pressure on the bearing member 26 and thus its ring 27 will compress the spring washer 29, flattening it.

After the disc 31 is secured within the socket 20 by swaging over the peripheral edge 32 of said socket, springs 29 and 30 will constantly exert a pressure upon their respective pressure elements or rings 27 and 28 and consequently upon their respective bearing members 26 and 25, and thus these bearing members will not only be urged toward and against each other, but also into intimate engagement with the ball member 24 to support said ball member within the socket.

Numeral 35 designates a rod which is attached in any manner, preferably by welding, to the outer surface of the cylindrical socket 20 and preferably so that the axis of said rod is substantially at right angles to the axis of the socket.

Figure 3:
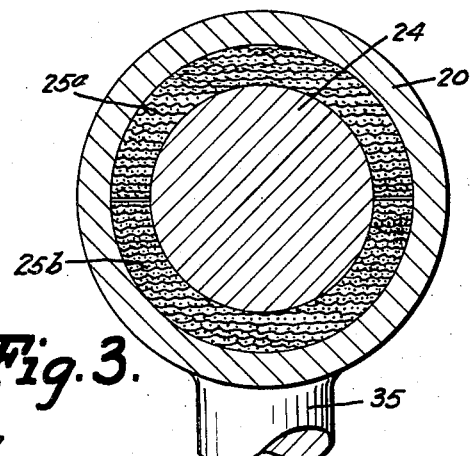
Fig. 3 is a sectional view taken along the line 3—3 of Fig. 2.

In Fig. 3 a ball and socket joint similar to the one shown in Fig. 1 is illustrated; however, in this joint a screw plug 36 is threadedly received by the socket to exert pressure upon the spring 30 instead of having the disc 31 secured therein by swaging the peripheral edge of the socket. In this instance too, bearing member 25 may be made up of two semi-cylindrical members 25a and 25b which are preformed to have a substantially semi-cylindrical outer surface and a spherical inner contour.

In this invention applicants have provided a ball and socket joint which may easily and quickly be assembled, said ball and socket joint being self lubricating and self compensating for wear, thereby substantially eliminating the necessity of personal attention by the operator of the vehicle.

While the form of embodiment of the present invention as herein disclosed, constitutes a preferred form, it is to be understood that other forms might be adopted, all coming within the scope of the claims which follow.

What is claimed is as follows:

1. A ball and socket joint comprising, in combination, a socket; a shaft having a ball end supported within said socket; a plurality of annuluses of lubricant containing bearing material within said socket supporting the ball end of the shaft; and resilient means in each end of the socket, urging the said annuluses against each other and against the ball end of the shaft.

2. A ball and socket joint comprising, in combination, a socket; a shaft having a ball end supported within said socket; a plurality of annuluses of lubricant containing bearing material within said socket supporting the ball end of the shaft; and undulated spring washers at the ends of the socket, urging the annuluses toward and against each other and against the ball end of the shaft.

3. A ball and socket joint comprising, in combination, a socket; a ball in said socket; annular bearing members within said socket, supporting said ball; a pressure plate in each end of the socket, engaging the outer edge of the bearing member adjacent the respective end of the socket; and resilient means compressed in each end of the socket and urging each pressure plate against its respective bearing member, and the bearing members against each other and the ball.

4. A ball and socket joint comprising, in combination, a socket; a shaft having a ball end supported within said socket; a plurality of annuluses of lubricant containing bearing material within said socket, supporting the ball end of the shaft; a pressure plate in each end of the socket; and a spring washer engaging each pressure plate, urging its pressure plate into pressing engagement with the edge of its respective annulus.

5. A ball and socket joint comprising, in combination, a cylindrical socket having an inwardly extending flange at its one end; a shaft having a ball end within said socket, the shaft extending through the opening defined by the said flange; a disc secured in the opposite end of the socket; a plurality of annuluses of lubricant containing bearing material within said socket, supporting the ball end of the shaft; and resilient means interposed between the flange of the socket and the disc secured in the end of said socket, exerting pressure upon the edges of adjacent bearing annuluses.

6. A ball and socket joint comprising, in combination, a cylindrical socket having an inwardly extending flange at its one end; a shaft having a ball end within said socket, the shaft extending through the opening defined by the said flange; a disc secured in the opposite end of the socket; a plurality of annuluses of lubricant containing bearing material within said socket, supporting the ball end of the shaft; a pressure ring in each end of the socket engaging the edge of adjacent bearing annuluses; and spring washers compressed between the pressure rings and the socket flange and disc.

7. A ball and socket joint comprising, in combination, a cylinder having an inwardly extending, annular flange at its one end, defining an opening; a rod secured to the outer, annular wall of said cylinder; a shaft extending through the opening defined by the flange and having a ball end inside the cylinder of greater diameter than said opening; bearing rings, of lubricant containing fabric, within said cylinder, supporting the ball end of the shaft; a disc secured in the end of the cylinder opposite its flanged end; a pressure ring in each end of the cylinder, engaging the edge of the adjacent bearing ring; and spring washers compressed between the respective bearing rings and the cylinder flange and the disc, said spring washers urging the pressure rings to maintain the bearing rings in intimate contact with the ball end of the shaft.

8. A ball and socket joint comprising, in combination, a cylinder providing a socket; a shaft having a ball end within said socket; annular bearing members within said socket, supporting the ball end of the shaft; a rod attached to the outside of the socket so that the axis of the rod is at right angles to the axis of the socket; rings of substantially stiff material within said socket, engaging the outer edges of the respective bearing members; and spring washers engaging the rings and urging them against the bearing members in a direction substantially parallel to the axis of the socket.

9. A ball and socket joint comprising, in combination, a cylinder having an inwardly extending annular flange at one end and providing the socket member of the joint; a shaft extending through the opening defined by the annular flange of the socket, said shaft having a ball end within the socket; annular bearing members within said socket, supporting the ball end of the shaft, one of said bearing members being narrower than the other and of a comparatively softer fabric than the other, and fitting within the socket adjacent its flanged end; a cover secured in the opposite end of the socket; stiff rings engaging the outer edges of the bearing members; and spring washers interposed between the rings and the adjacent cover and flange, said spring washers urging the bearing members toward and against each other.

In testimony whereof we hereto affix our signatures.

BAYARD D. KUNKLE.
EDWIN F. ROSSMAN.